(12) United States Patent
Hatch

(10) Patent No.: US 8,085,508 B2
(45) Date of Patent: Dec. 27, 2011

(54) SYSTEM, METHOD AND APPARATUS FOR FLEXURE-INTEGRATED MICROACTUATOR

(75) Inventor: Michael R. Hatch, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 943 days.

(21) Appl. No.: 12/058,096

(22) Filed: Mar. 28, 2008

(65) Prior Publication Data

US 2009/0244786 A1 Oct. 1, 2009

(51) Int. Cl.
- *G11B 21/10* (2006.01)
- *G11B 5/596* (2006.01)
- *G11B 21/21* (2006.01)

(52) U.S. Cl. .................. 360/294.4; 360/245.3

(58) Field of Classification Search .... 360/294.3–294.6, 360/245.7, 245.9, 245.3
See application file for complete search history.

(56) References Cited

U.S. PATENT DOCUMENTS

| | | |
|---|---|---|
| 5,489,812 A | 2/1996 | Furuhata et al. |
| 5,709,802 A | 1/1998 | Furuhata et al. |
| 5,796,558 A | 8/1998 | Hanrahan et al. |
| 5,936,805 A | 8/1999 | Imaino |
| 5,959,808 A | 9/1999 | Fan et al. |
| 5,995,334 A | 11/1999 | Fan et al. |
| 5,998,906 A | 12/1999 | Jerman et al. |
| 6,046,888 A | 4/2000 | Krinke et al. |
| 6,055,132 A | 4/2000 | Arya et al. |
| 6,064,550 A | 5/2000 | Koganezawa |
| 6,078,473 A | 6/2000 | Crane et al. |
| 6,078,476 A | 6/2000 | Magee et al. |
| 6,088,907 A | 7/2000 | Lee et al. |
| 6,122,149 A | 9/2000 | Zhang et al. |
| 6,157,522 A | 12/2000 | Murphy et al. |
| 6,163,434 A | 12/2000 | Zhang |
| 6,166,890 A | 12/2000 | Stefansky et al. |
| 6,194,892 B1 | 2/2001 | Lin et al. |
| 6,198,606 B1 | 3/2001 | Boutaghou et al. |
| 6,201,668 B1 | 3/2001 | Murphy |
| 6,215,629 B1 | 4/2001 | Kant et al. |
| 6,219,203 B1 | 4/2001 | Arya et al. |
| 6,233,124 B1 | 5/2001 | Budde et al. |
| 6,256,175 B1 | 7/2001 | Zhang |
| 6,265,139 B1 | 7/2001 | Yun et al. |
| 6,297,936 B1 | 10/2001 | Kant et al. |
| 6,320,730 B1 | 11/2001 | Stefansky et al. |
| 6,331,923 B1 | 12/2001 | Mei |
| 6,335,850 B1 | 1/2002 | Dunfield et al. |
| 6,356,418 B1 | 3/2002 | Heaton et al. |
| 6,359,758 B1 | 3/2002 | Boutaghou |
| 6,360,035 B1 | 3/2002 | Hurst, Jr. et al. |
| 6,376,964 B1 | 4/2002 | Young et al. |
| 6,379,809 B1 | 4/2002 | Simpson et al. |
| 6,381,104 B1 | 4/2002 | Soeno et al. |

(Continued)

FOREIGN PATENT DOCUMENTS

JP 2003059219 A * 2/2003

(Continued)

*Primary Examiner* — Will J Klimowicz

(57) ABSTRACT

A piezo in-tongue microactuator includes a suspension assembly with a flexure tongue. The tongue has two slots that accept piezo actuators. The tongue also has multiple hinge flexible elements that translate the extension and/or contraction of the piezo actuators into rotary motion of the recording head. This rotary motion is then used to precisely position the recording element over the desired track on the hard disk drive and permits higher track density to be achieved.

44 Claims, 13 Drawing Sheets

U.S. PATENT DOCUMENTS

| | | |
|---|---|---|
| 6,393,681 B1 | 5/2002 | Summers |
| 6,396,174 B1 | 5/2002 | Vigna et al. |
| 6,396,667 B1 | 5/2002 | Zhang et al. |
| 6,404,599 B1 | 6/2002 | Vigna |
| 6,404,600 B1 | 6/2002 | Hawwa et al. |
| 6,411,475 B1 | 6/2002 | Khan et al. |
| 6,414,822 B1 | 7/2002 | Crane et al. |
| 6,414,823 B1 | 7/2002 | Crane et al. |
| 6,421,211 B1 | 7/2002 | Hawwa et al. |
| 6,450,702 B1 | 9/2002 | Komoriya et al. |
| 6,472,799 B2 | 10/2002 | Takeuchi et al. |
| 6,473,274 B1 | 10/2002 | Mainmone et al. |
| 6,476,538 B2 | 11/2002 | Takeuchi et al. |
| 6,487,055 B1 | 11/2002 | Mei |
| 6,495,944 B2 | 12/2002 | Hirano et al. |
| 6,498,419 B1 | 12/2002 | Takeuchi et al. |
| 6,501,625 B1 | 12/2002 | Boismier et al. |
| 6,512,659 B1 | 1/2003 | Hawwa et al. |
| 6,522,050 B2 | 2/2003 | Sivadasan et al. |
| 6,524,878 B2 | 2/2003 | Abe et al. |
| 6,531,805 B2 | 3/2003 | Ikeda et al. |
| 6,535,360 B1 | 3/2003 | Kim et al. |
| 6,541,898 B2 | 4/2003 | Kitajima et al. |
| 6,545,846 B1 | 4/2003 | Chee et al. |
| 6,552,878 B2 | 4/2003 | Sato et al. |
| 6,574,077 B1 | 6/2003 | Crane et al. |
| 6,590,748 B2 | 7/2003 | Murphy et al. |
| 6,593,677 B2 | 7/2003 | Behin et al. |
| 6,600,622 B1 | 7/2003 | Smith |
| 6,611,399 B1 | 8/2003 | Mei et al. |
| 6,614,627 B1 | 9/2003 | Shimizu et al. |
| 6,614,628 B2 | 9/2003 | Crane et al. |
| 6,624,553 B2 | 9/2003 | Sivadasan et al. |
| 6,629,461 B2 | 10/2003 | Behin et al. |
| 6,633,458 B2 | 10/2003 | Wu et al. |
| 6,634,083 B1 | 10/2003 | Boutaghou |
| 6,639,761 B1 | 10/2003 | Boutaghou et al. |
| 6,643,902 B2 | 11/2003 | Takeuchi et al. |
| 6,653,761 B2 | 11/2003 | Fujii et al. |
| 6,653,763 B2 | 11/2003 | Wang et al. |
| 6,655,002 B1 | 12/2003 | Maimone et al. |
| 6,671,132 B1 | 12/2003 | Crane et al. |
| 6,680,825 B1 | 1/2004 | Murphy et al. |
| 6,680,826 B2 | 1/2004 | Shiraishi et al. |
| 6,683,757 B1 | 1/2004 | Bonin et al. |
| 6,683,758 B2 | 1/2004 | Hipwell, Jr. et al. |
| 6,690,551 B2 | 2/2004 | Shiraishi et al. |
| 6,697,211 B2 | 2/2004 | Koganezawa |
| 6,697,232 B1 | 2/2004 | Hipwell, Jr. et al. |
| 6,700,749 B2 | 3/2004 | Shiraishi et al. |
| 6,703,767 B1 | 3/2004 | Summers |
| 6,704,157 B2 | 3/2004 | Himes et al. |
| 6,704,158 B2 | 3/2004 | Hawwa et al. |
| 6,707,121 B2 | 3/2004 | De Moor et al. |
| 6,707,633 B2 | 3/2004 | Okuyama et al. |
| 6,724,560 B2 | 4/2004 | Koganezawa et al. |
| 6,728,077 B1 | 4/2004 | Murphy |
| 6,731,465 B2 | 5/2004 | Crane et al. |
| 6,731,472 B2 | 5/2004 | Okamoto et al. |
| 6,738,231 B2 | 5/2004 | Arya et al. |
| 6,744,173 B2 | 6/2004 | Behin et al. |
| 6,744,183 B2 | 6/2004 | Kitajima et al. |
| 6,744,577 B1 | 6/2004 | Guo et al. |
| 6,744,589 B2 | 6/2004 | Morris et al. |
| 6,751,047 B2 | 6/2004 | Bonin et al. |
| 6,751,069 B2 | 6/2004 | Yao et al. |
| 6,751,832 B2 | 6/2004 | Hirota et al. |
| 6,754,047 B2 | 6/2004 | Pan et al. |
| 6,757,140 B1 | 6/2004 | Hawwa |
| 6,760,196 B1 | 7/2004 | Niu et al. |
| 6,765,743 B2 | 7/2004 | Goodman et al. |
| 6,765,761 B2 | 7/2004 | Arya |
| 6,765,766 B2 | 7/2004 | Hipwell, Jr. et al. |
| 6,778,350 B2 | 8/2004 | Bonin et al. |
| 6,779,247 B1 | 8/2004 | Murari et al. |
| 6,785,086 B1 | 8/2004 | Bonin et al. |
| 6,798,119 B2 | 9/2004 | Ikeda et al. |
| 6,807,030 B1 | 10/2004 | Hawwa et al. |
| 6,819,822 B2 | 11/2004 | Behin et al. |
| 6,825,590 B2 | 11/2004 | Murphy |
| 6,831,539 B1 | 12/2004 | Hipwell, Jr. et al. |
| 6,848,154 B2 | 2/2005 | Fjuii et al. |
| 6,851,120 B2 | 2/2005 | Crane et al. |
| 6,853,517 B2 | 2/2005 | Hirano et al. |
| 6,856,070 B2 | 2/2005 | Wang et al. |
| 6,859,345 B2 | 2/2005 | Boutaghou et al. |
| 6,873,497 B2 | 3/2005 | Yao et al. |
| 6,879,468 B2 | 4/2005 | Nakamura et al. |
| 6,883,215 B2 | 4/2005 | Takeuchi et al. |
| 6,891,701 B2 | 5/2005 | Shiraishi et al. |
| 6,894,876 B1 | 5/2005 | Coon |
| 6,897,083 B2 | 5/2005 | Milligan |
| 6,903,497 B2 | 6/2005 | Uchiyama et al. |
| 6,922,303 B2 | 7/2005 | Blick et al. |
| 6,927,946 B2 | 8/2005 | Shum et al. |
| 6,927,947 B2 | 8/2005 | Shimizu et al. |
| 6,930,860 B1 | 8/2005 | Coffey |
| 6,943,991 B2 | 9/2005 | Yao et al. |
| 6,956,724 B2 | 10/2005 | Shiraishi et al. |
| 6,961,221 B1 | 11/2005 | Niu et al. |
| 6,965,500 B1 | 11/2005 | Hanna et al. |
| 6,972,924 B1 | 12/2005 | Chen et al. |
| 6,975,123 B1 | 12/2005 | Malang et al. |
| 6,975,477 B1 | 12/2005 | Hu et al. |
| 7,006,333 B1 | 2/2006 | Summers |
| 7,009,804 B2 | 3/2006 | Sharma et al. |
| 7,012,780 B1 | 3/2006 | Hu et al. |
| 7,013,554 B2 | 3/2006 | Wong et al. |
| 7,016,159 B1 | 3/2006 | Bjorstrom et al. |
| 7,019,442 B2 | 3/2006 | Namerikawa et al. |
| 7,023,667 B2 | 4/2006 | Shum |
| 7,031,099 B2 | 4/2006 | Kohso et al. |
| 7,046,485 B2 | 5/2006 | Kuwajima et al. |
| 7,046,486 B1 | 5/2006 | Coffey |
| 7,057,857 B1 | 6/2006 | Niu et al. |
| 7,057,858 B2 | 6/2006 | Pan et al. |
| 7,064,401 B2 | 6/2006 | Uchiyama et al. |
| 7,072,134 B1 | 7/2006 | Hirano et al. |
| 7,072,150 B2 | 7/2006 | Kuwajima et al. |
| 7,079,339 B1 | 7/2006 | Semba et al. |
| 7,083,737 B2 | 8/2006 | Lee et al. |
| 7,085,083 B2 | 8/2006 | Zhu et al. |
| 7,095,591 B2 | 8/2006 | Imamura et al. |
| 7,099,115 B2 | 8/2006 | Yao et al. |
| 7,110,224 B2 | 9/2006 | Nakamura et al. |
| 7,113,371 B1 | 9/2006 | Hanna et al. |
| 7,116,523 B2 | 10/2006 | Lee et al. |
| 7,116,525 B2 | 10/2006 | Del Sarto et al. |
| 7,119,991 B2 | 10/2006 | Yao et al. |
| 7,126,252 B2 | 10/2006 | Kita |
| 7,126,785 B1 | 10/2006 | Li et al. |
| 7,130,160 B2 | 10/2006 | Kwon et al. |
| 7,149,060 B2 | 12/2006 | Yang et al. |
| 7,154,702 B2 | 12/2006 | Takekawa et al. |
| 7,159,300 B2 | 1/2007 | Yao et al. |
| 7,160,403 B2 | 1/2007 | Yao |
| 7,177,119 B1 | 2/2007 | Bennin et al. |
| 7,181,825 B2 | 2/2007 | Yao et al. |
| 7,199,978 B2 | 4/2007 | Yao et al. |
| 7,215,068 B2 | 5/2007 | Koganezawa et al. |
| 7,215,499 B1 | 5/2007 | Li et al. |
| 7,218,482 B2 | 5/2007 | Yao et al. |
| 7,225,513 B2 | 6/2007 | Yao et al. |
| 7,230,800 B2 | 6/2007 | Hirano et al. |
| 7,239,487 B2 | 7/2007 | Mastromatteo et al. |
| 7,240,417 B2 | 7/2007 | Yao et al. |
| 7,248,443 B2 | 7/2007 | Kwon et al. |
| 7,256,967 B2 | 8/2007 | Yao et al. |
| 7,256,968 B1 | 8/2007 | Krinke |
| 7,298,593 B2 | 11/2007 | Yao et al. |
| 7,345,851 B2 | 3/2008 | Hirano et al. |
| 7,382,583 B2 | 6/2008 | Hirano et al. |
| 7,839,604 B1 * | 11/2010 | Coffey et al. ............ 360/265.9 |
| 7,843,666 B2 * | 11/2010 | Yao et al. ............ 360/245.3 |
| 2001/0021086 A1 | 9/2001 | Kuwajima et al. |
| 2005/0013056 A1 | 1/2005 | Kuwajima et al. |
| 2007/0230060 A1 | 10/2007 | Yao et al. |

FOREIGN PATENT DOCUMENTS

| | | | | |
|---|---|---|---|---|
| JP | 2007042262 A | * | 2/2007 | |
| JP | 2007257824 A | * | 10/2007 | |
| JP | 2007317349 A | * | 12/2007 | |

* cited by examiner

SYSTEM, METHOD AND APPARATUS FOR FLEXURE-INTEGRATED MICROACTUATOR

BACKGROUND OF THE INVENTION

1. Technical Field

The present invention relates in general to hard disk drives and, in particular, to an improved system, method, and apparatus for a microactuator used in the precise positioning of the recording head element in a hard disk drive.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm). Hard disk drives have several different typical standard sizes or formats, including server, desktop, mobile and microdrive.

A typical HDD also utilizes an actuator assembly. The actuator moves magnetic read/write beads to the desired location on the rotating disk so as to write information to or read data from that location having an air bearing surface (ABS) that enables the slider to fly at a constant height close to the disk during operation of the disk drive, by a cushion of air generated by the rotating disk. Within most HDDs, the magnetic read/write head transducer is mounted on a slider. A slider generally serves to mechanically support the head and any electrical connections between the head and the rest of the disk drive system. The slider is aerodynamically shaped to glide over the boundary layer of air dragged by the disk to maintain a uniform distance from the surface of the rotating disk, thereby preventing the head from undesirably contacting the disk. Each slider is attached to the free end of a suspension that in turn is cantilevered from the rigid arm of an actuator. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The motor used to rotate the disk is typically a brushless DC motor. The disk is mounted and clamped to a hub of the motor. The hub provides a disk mounting surface and a means to attach an additional part or parts to clamp the disk to the hub. In most typical motor configurations of HDDs, the rotating part of the motor or rotor is attached to or is an integral part of the hub. The rotor includes a ring-shaped magnet with alternating north/south poles arranged radially and a ferrous metal backing. The magnet interacts with the motor's stator by means of magnetic forces. Magnetic fields and resulting magnetic forces are induced by way of the electric current in the coiled wire of the motor stator. The ferrous metal backing of the rotor acts as a magnetic return path. For smooth and proper operation of the motor, the rotor magnet magnetic pole pattern should not be substantially altered after it is magnetically charged during the motor's manufacturing process.

The suspension of a conventional disk drive typically includes a relatively stiff load beam with a mount plate at the base end, which subsequently attaches to the actuator arm, and whose free end mounts a flexure that carries the slider and its read/write head transducer. Disposed between the mount plate and the functional end of the load beam is a 'hinge' that is compliant in the vertical bending direction (normal to the disk surface). The hinge enables the load beam to suspend and load the slider and the read/write head toward the spinning disk surface. It is then the job of the flexure to provide gimbaled support for the slider so that the read/write head can pitch and roll in order to adjust its orientation for unavoidable disk surface axial run-out or flatness variations.

The flexure in an integrated lead suspension is generally made out of a laminated multilayer material. Typically, it consists of a support layer (e.g., steel), a dielectric insulating layer (e.g., polyimide), a conductor layer (e.g., copper), and a cover layer (e.g., polyimide) that insulates the conductor layer. The electrical lead lines are etched into the conductor layer, while the polyimide layer serves as the insulator from the underlying steel support layer. The steel support layer is also patterned to provide strength and gimbaling characteristics to the flexure. The conducting leads, called traces, which electrically connect the head transducer to the read/write electronics, are often routed on both sides of the suspension, especially in the gimbal region. Normally the traces consist of copper conductor with polyimide dielectric insulating and cover layers but no support stainless steel layer and only provide the electrical function. The primary mechanical support function is provided by the flexure legs (e.g., steel) which normally run adjacent to the traces.

Some hard disk drives employ micro- or milli-actuator designs to provide second stage actuation of the recording head to enable more accurate positioning of the head relative to the recording track. Milli-actuators are broadly classified as actuators that move the entire front end of the suspension: spring, load beam, flexure and slider. Micro-actuators are broadly classified as actuators that move only the slider, moving it relative to the load beam, or moving the read-write element only, moving it relative to the slider body.

Previously, the objective for most designs was to provide a lateral motion of the slider recording element on the order of about 1 to 2 microns. The required lateral motion of the slider is defined by the track density of the drive and the size of the off-track motions of the slider required to follow the track due to turbulence, external vibration, etc.

Milli-actuators have issues with dynamic performance. For example, when the entire load beam is actuated, milli-actuators exert significant reaction forces into the actuator arms, exciting relatively low frequency actuator resonances. They also have characteristically lower frequency resonances than microactuators. These two factors limit their performance.

There are many types of micro-actuator designs. One type of microactuator (see, e.g., U.S. Pat. No. 7,159,300 to Yao) uses a ceramic U-shaped frame with thin-film piezo layers on the outer surfaces of the "U" to surround the slider, in the same plane as the slider, and attaches to the slider at the front of the U-shaped arms. Actuating the piezos on the two side arms moves the slider laterally. Although this design is workable, issues such as cost, reliability and fragility during shock have limited its usefulness.

Another type of microactuator (see, e.g., U.S. Pat. No. 7,046,485 to Kuwajima) uses two thin-film piezos on either side of a thin adhesive layer. Two of these piezos are located below and in the same plane as the load beam. The piezos then alternately expand and contract to provide a rotary motion about a "hinge", allowing rotary motion of the slider.

In addition, various types of micro-electromechanical systems ("MEMS") actuators have been designed. Some of these earlier designs used an electrostatic rotary design, but high cost and fragility made them unworkable. Thus, an improved system, method, and apparatus for a microactuator used in the precise positioning of the recording head element in a hard disk drive would be desirable.

SUMMARY OF THE INVENTION

Embodiments of a system, method, and apparatus for a microactuator used in the precise manipulation of the slider head element in a hard disk drive are disclosed. A piezo actuator design overcomes the cost, manufacturability and fragility issues associated with previous microactuator designs.

Rather than achieving a 1 to 2 micron motion of the slider, the invention provides movement of the slider element in the lateral (i.e., side-to-side) direction that is an order of magnitude less, or in the 0.1 to 0.2 micron range. This smaller positioning displacement works well because HDD track densities have increased and, combined with other disk drive design improvements, have reduced the off-track error that the slider is required to follow. One of the invention's design advantages is that only the cost of the piezos is added to manufacturing expenses. Another design advantage is that almost all other functions of the design are the same as for a conventional suspension, including the same gimbaling stiffnesses and manufacturing processes.

In one embodiment, the hard disk drive suspension comprises a load beam extending in a longitudinal direction, which defines a lateral direction that is orthogonal to the longitudinal direction. A transverse direction is orthogonal to both the longitudinal and lateral directions. The load beam has a load beam dimple that defines a dimple axis extending in the transverse direction. A flexure is mounted to the load beam and has a tongue with a leading edge portion and a slider attachment platform that is longitudinally spaced apart from the leading edge portion.

A slider is mounted to the slider attachment platform and has a freedom of rotation about the dimple axis. Electrical conductors extend along the flexure and are in electrical communication with the slider. The conductors have conductor outrigger portions that are outboard of the tongue in the lateral direction. A microactuator is mounted directly in the tongue between the leading edge portion and the slider attachment platform. The microactuator selectively rotates the slider about the dimple axis.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Figure 1:
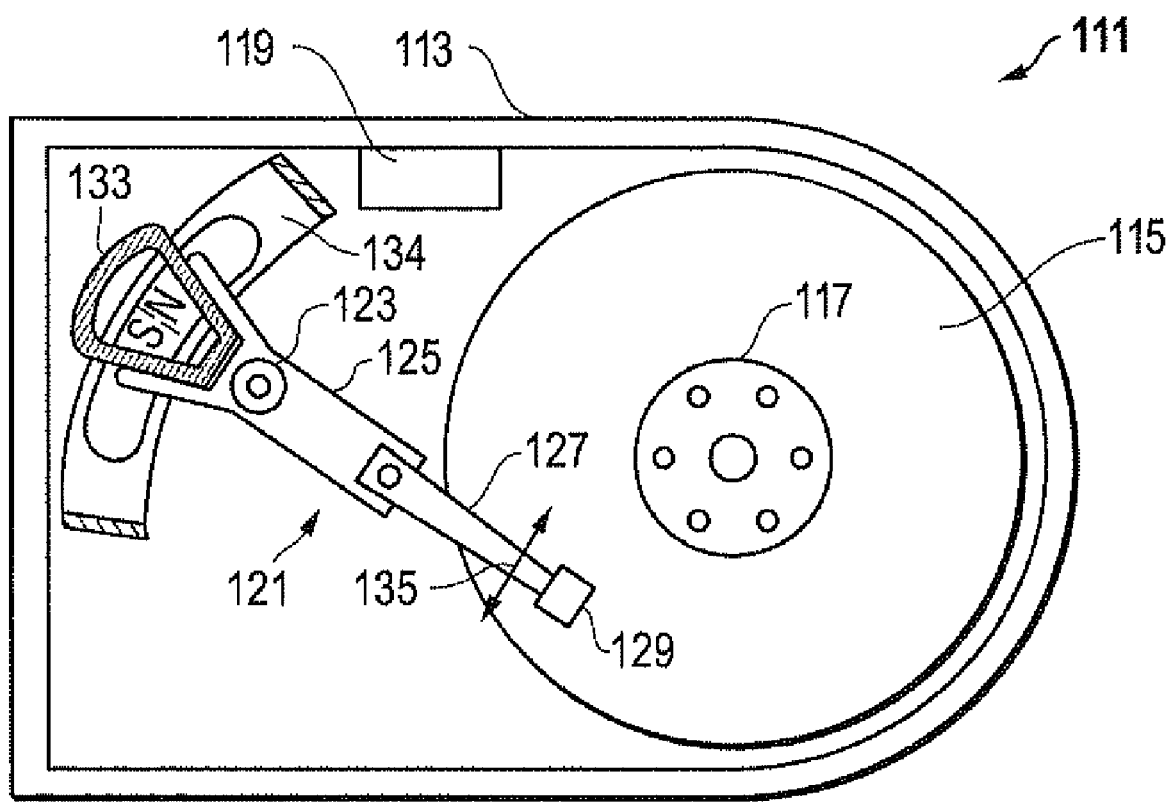
FIG. 1 is a schematic plan view of one embodiment of a disk drive constructed in accordance with the invention.

Referring to FIG. 1, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117. An actuator 121 comprises one or more parallel actuator arms 125 in the form of a comb that is pivotally mounted to base 113 about a pivot assembly 123. A controller 119 is also mounted to base 113 for selectively moving the comb of arms 125 relative to disk 115.

Figure 4:
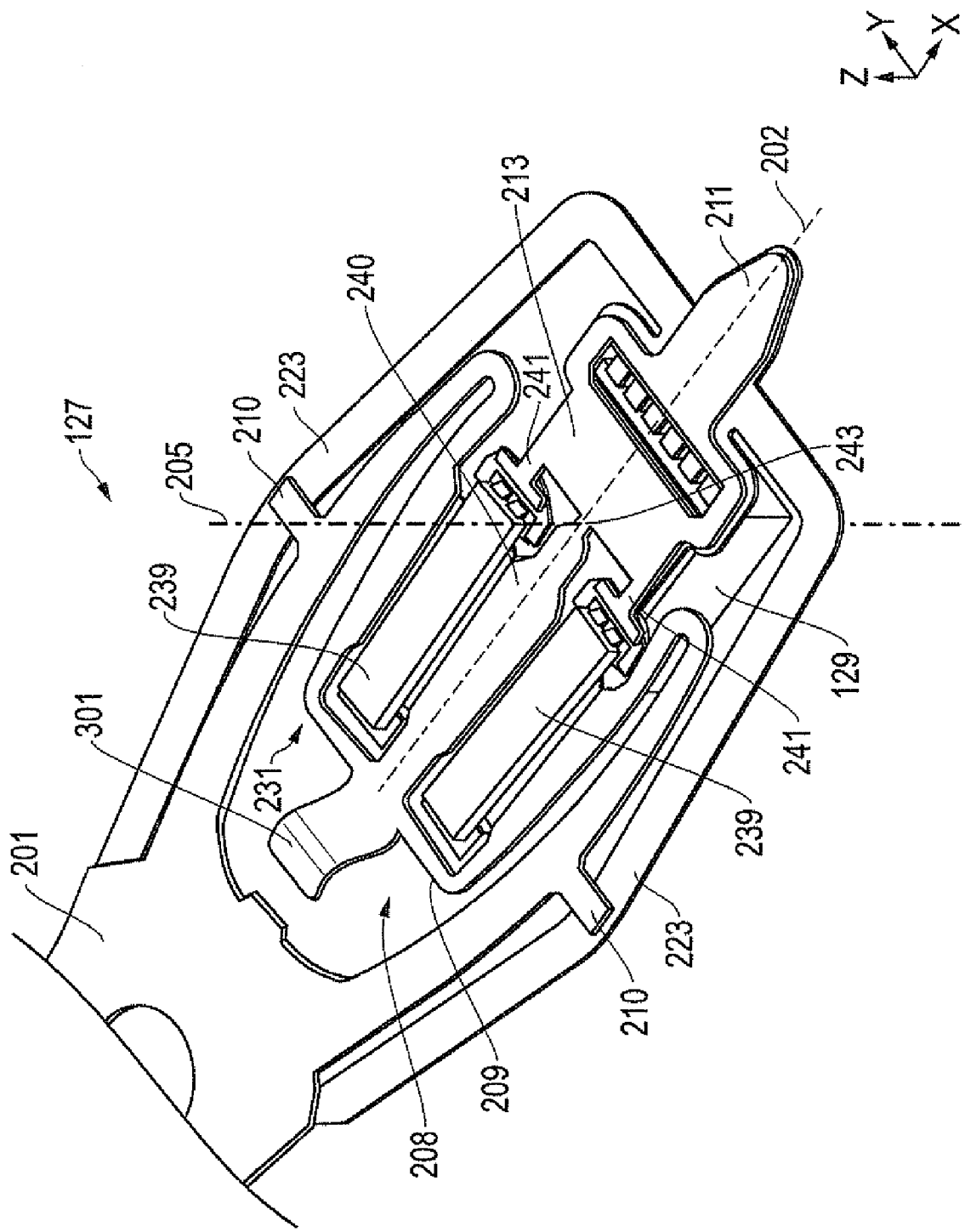
FIG. 4 is an enlarged isometric view of a distal end of one embodiment of the suspension shown without the load beam and is constructed in accordance with the invention.

In the embodiment shown, each arm 125 has extending from it at least one cantilevered load beam 127. A magnetic read/write transducer or head is mounted on a slider 129 and secured to a flexure that is flexibly mounted to the load beam 127. The read/write heads magnetically read data from and/or magnetically write data to disk 115. The slider 129 is usually bonded to the flexure tongue 208 (FIG. 4). The head is typically formed from ceramic or intermetallic materials and is pre-loaded against the surface of disk 115 by the suspension.

Suspensions have a spring-like quality which biases or urges the air bearing surface of the slider 129 against the disk 115 to enable the creation of the air bearing film between the slider 129 and disk surface. A voice coil 133 housed within a voice coil motor magnet assembly 134 is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks.

Figure 2:
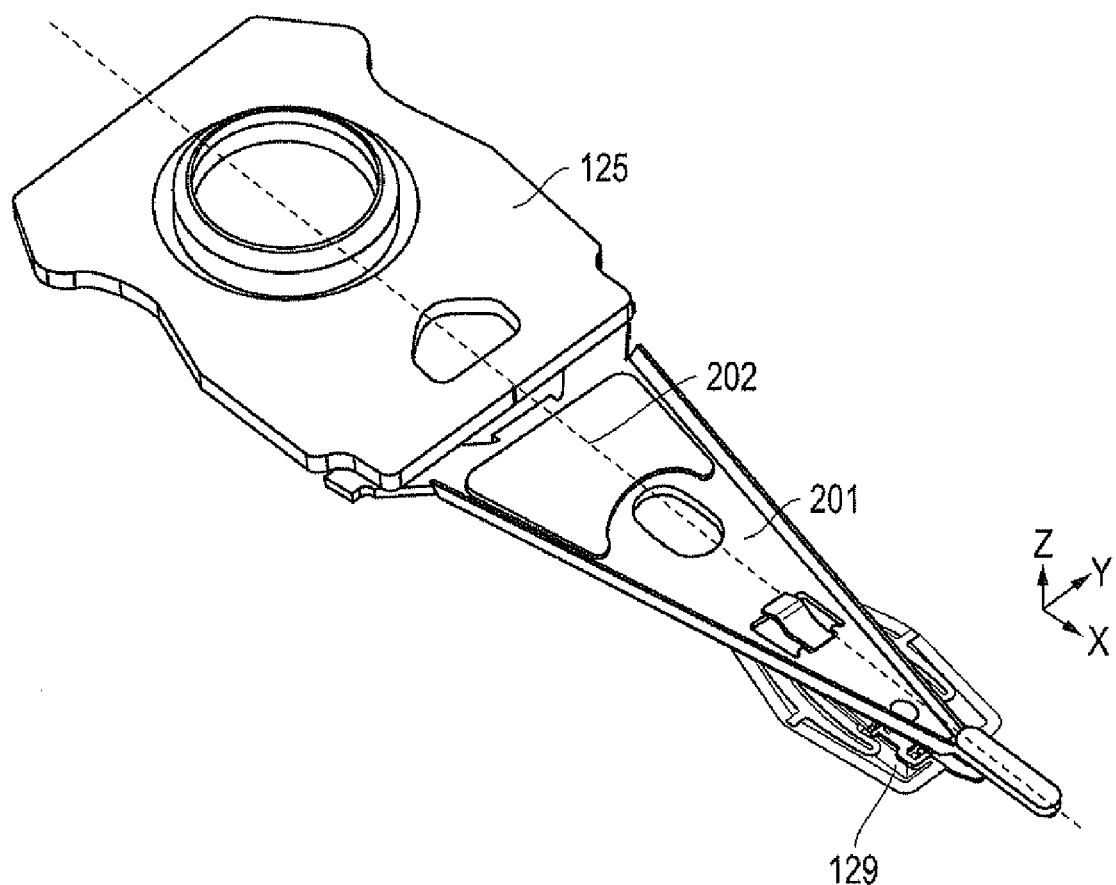
FIG. 2 is a top isometric view of one embodiment of a load beam and suspension for the disk drive of FIG. 1 and is constructed in accordance with the invention.

Referring now to FIGS. 2-15, various illustrations of embodiments of suspensions for a hard disk drive are shown. In one version, the invention comprises a load beam 201 (FIG. 2) extending in a longitudinal direction x and having a longitudinal axis 202. A lateral direction y is defined as being orthogonal to the longitudinal direction x. A transverse direction z is orthogonal to both the longitudinal and lateral directions x, y. The load beam 201 has a load beam dimple 203 (FIG. 5) that defines a dimple axis 205 extending in the transverse direction z. The load beam dimple 203 may be provided with a transverse dimension on the order of 7.5 microns below the load beam bottom surface to provide additional transverse clearance for the piezos with respect to the load beam when the flexure tongue, piezos and slider are rotated in the pitch direction (i.e., about a lateral axis) by approximately 1.5 degrees prior to loading onto the disk.

Figure 5:
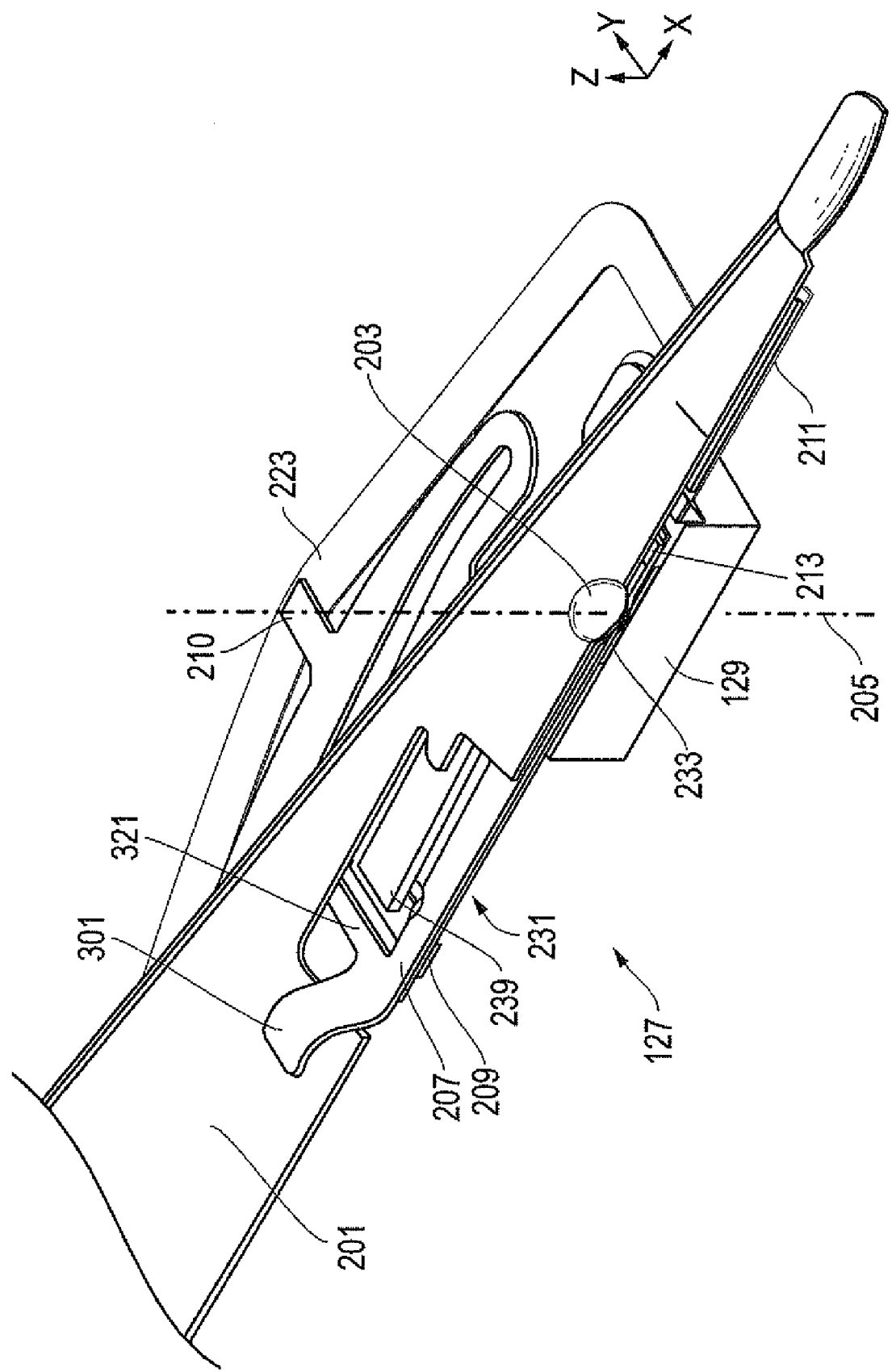
FIG. 5 is a further enlarged half-isometric view of one embodiment of the suspension shown with the load beam and is constructed in accordance with the invention.

As shown in FIGS. 4 and 5, a flexure 207 is mounted to the load beam 201 and has a tongue 208 with a leading edge portion 209, a trailing edge limiter 211, and a slider attachment platform 213 that is longitudinally spaced apart from the leading edge portion 209. In one embodiment, the tongue 208 may be defined as extending from the tongue leading edge portion 209 to the trailing edge limiter 211.

The flexure 207 also may comprise a pair of tabs 210 that extend in lateral directions y and are connected to the conductor outrigger portions 223 as shown. An insulator is located between the tabs 210 and the copper traces in the conductor outrigger portions 223. In one embodiment, the conductor outrigger portions define a maximum dimension of the flexure in the lateral direction, and the pair of tabs is connected to the conductor outrigger portions at or adjacent to the maximum dimension of the flexure.

In one embodiment, a slider 129 (FIGS. 5 and 6) is bonded to the stainless steel lower surface of the slider attachment platform 213 and has a freedom of rotation about the dimple axis 205. A plurality of traces or electrical conductors 221 (FIGS. 6 and 7) extend along the load beam 201 and are in electrical communication with the slider 129. The traces 221 have trace outrigger portions 223 that are outboard of the flexure 207 in the lateral direction y.

Figure 7:
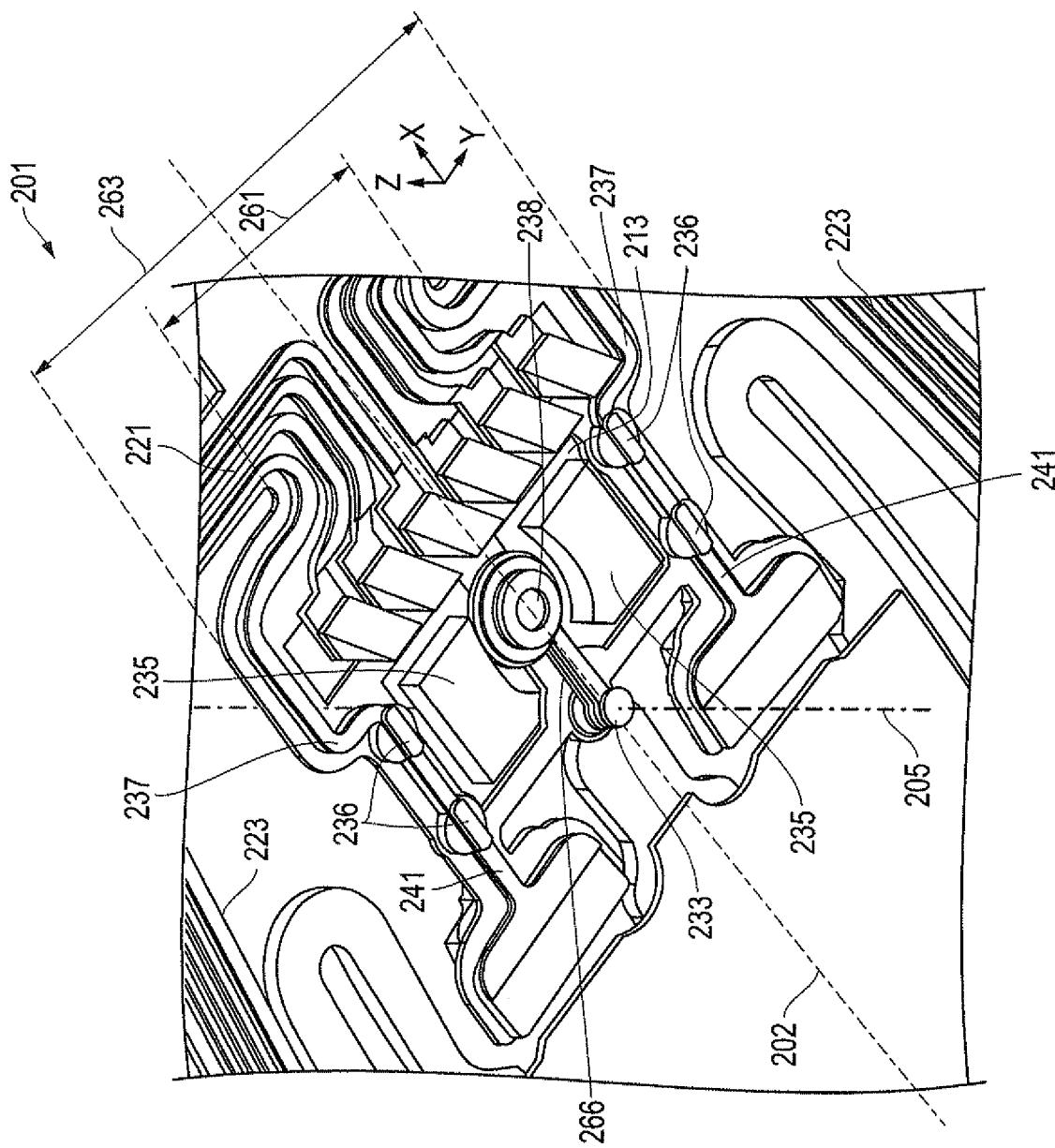
FIG. 7 is an enlarged lower isometric view of one embodiment of the suspension shown without a slider and is constructed in accordance with the invention.
Figure 8:
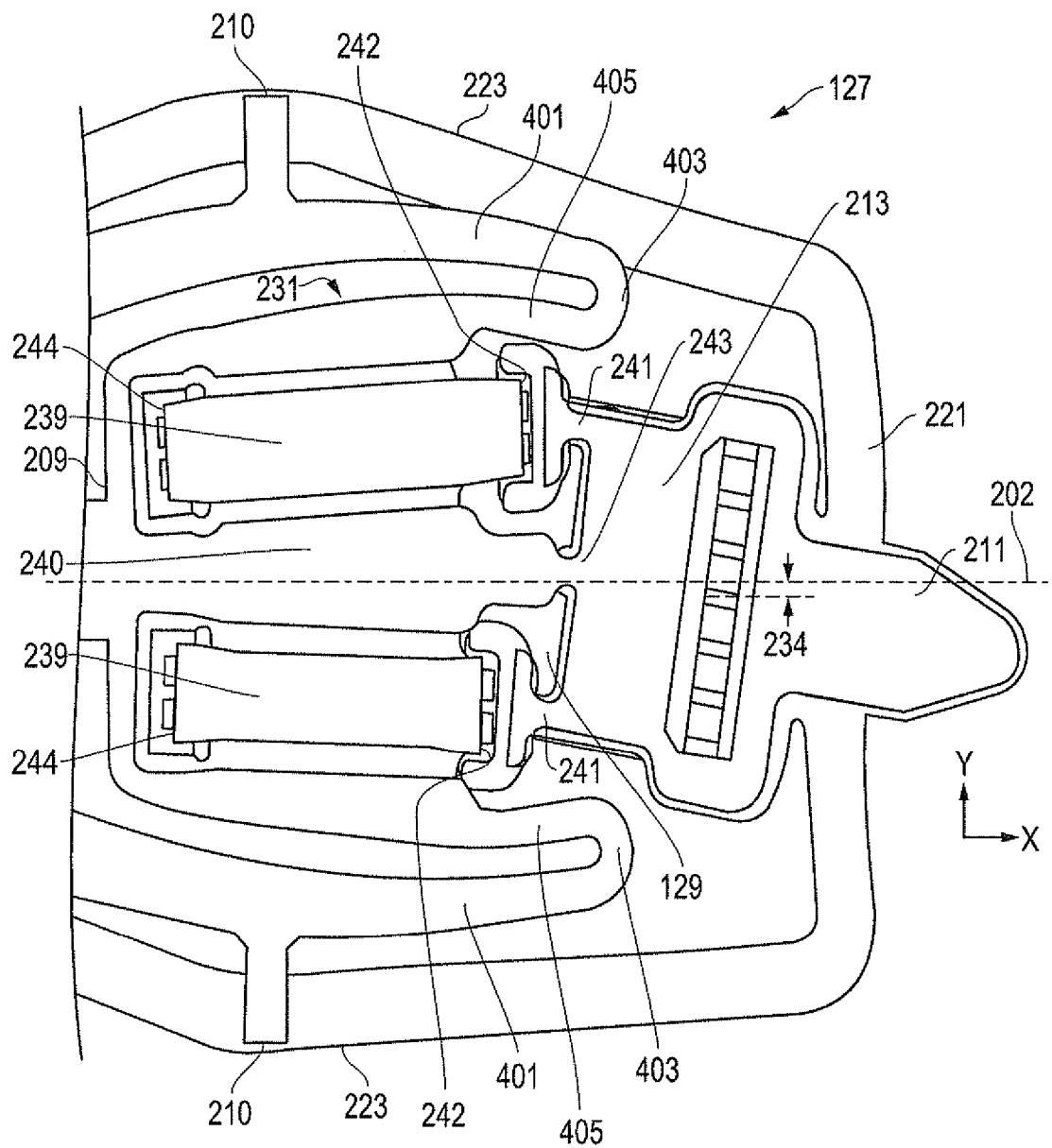
FIG. 8 is a plan view of one embodiment of the suspension illustrating a range of motion thereof and is constructed in accordance with the invention.

As best shown in FIGS. 4 and 8, the invention also comprises a microactuator 231 that is located directly in the tongue 208 of the flexure 207. In one embodiment, the microactuator 231 extends between the leading edge portion 209 and the slider attachment platform 213. The microactuator 231 selectively rotates the slider 129 (compare, e.g., FIGS. 6 and 7) about the dimple axis 205. In the hard disk drive, the trailing edge 222 of the slider 129 has transducers for reading data from and/or writing to the magnetic disk 115 (FIG. 1). In the embodiment of FIG. 8, which depicts a deformed shape plot that is exaggerated to show deflection, the microactuator 231 rotates the slider 129 by +/−0.02 degrees about the dimple axis 205, which laterally translates the transducers by +/−0.16 microns (i.e., distance 234) relative to the longitudinal axis 202.

Figure 12:
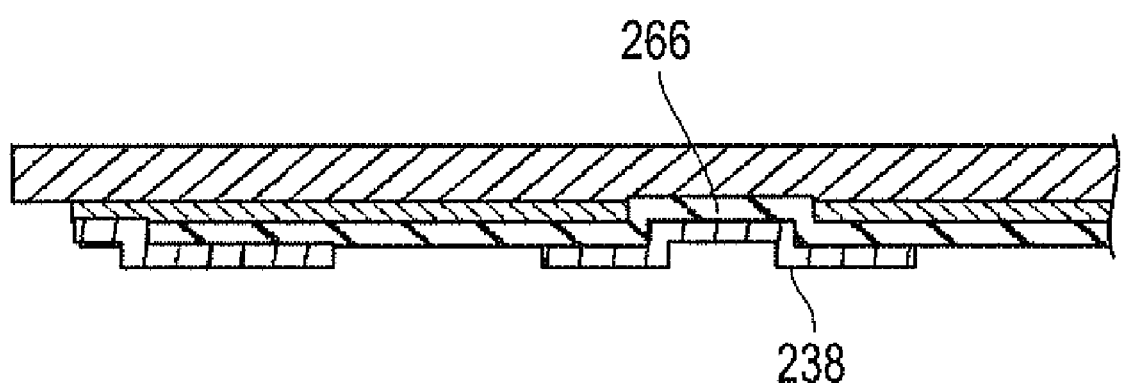
FIG. 12 is a partial sectional view of one embodiment of some of the electrical connections for the suspension and is constructed in accordance with the invention.
Figure 15:
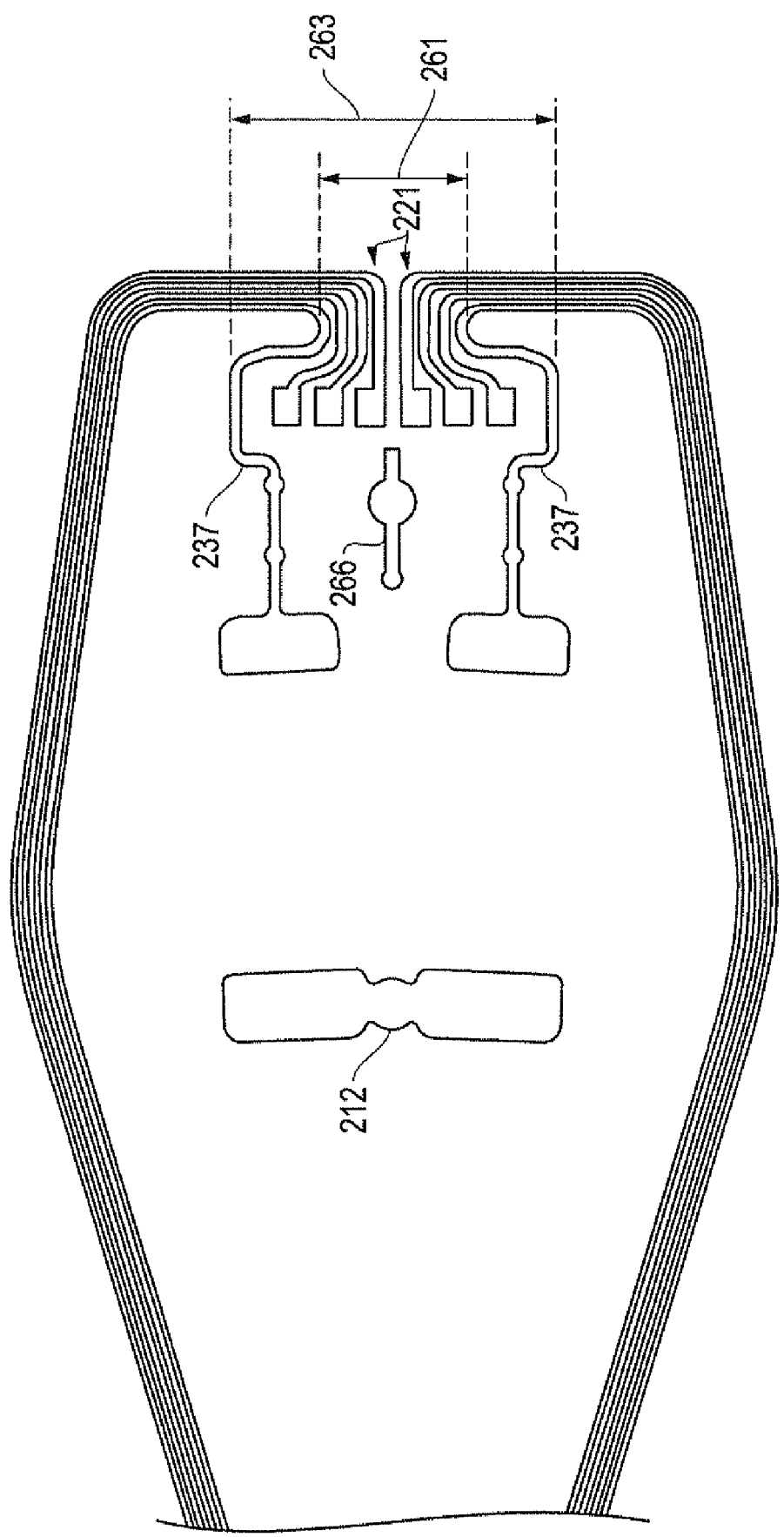
FIG. 15 is a partial plan view of one embodiment of a conductor layer for the flexure and is constructed in accordance with the invention.

Referring now to FIGS. 5 and 7, a polyimide dimple 233 may be transversely located between the flexure 207 and the slider 129 at the dimple axis 205. One or more rigid structural adhesive pads 235 also may be located between the slider 129 and the slider attachment platform 213. In addition to adhesive pads 235, additional registration pads 236 may be mounted transversely between the traces 237 and the slider 129. Moreover, a center registration pad 238 may be located laterally between the outer registration pads 236 and mounted longitudinally adjacent the polyimide dimple 233. As shown in FIGS. 7, 12 and 15, a small conductive via 266 may be used to electrically connect pad 238 to the steel layer (e.g., slider attachment platform 213) of the flexure.

In one embodiment, the microactuator 231 comprises a piezo actuating device that is responsive to electrical signals provided thereto by additional traces 237 (FIG. 7). The piezo microactuator may comprise a pair of piezos 239 (FIG. 4) extending substantially longitudinally. As best shown in FIGS. 4 and 8, each piezo 239 may be oriented with respect to the longitudinal axis at an angle (e.g., less than 5 degrees), such that the piezos are longitudinally symmetrical about the longitudinal axis. However, the angle may be more or less than 5 degrees.

Piezoelectric ceramics are known for what are called the piezoelectric and reverse piezoelectric effects. The piezoelectric effect causes a crystal to produce an electrical potential when it is subjected to mechanical stress. In contrast, the reverse piezoelectric effect causes the crystal to displace when it is placed in an electric field with a particular orientation relative to the previously poled direction of the piezo.

Figure 6:
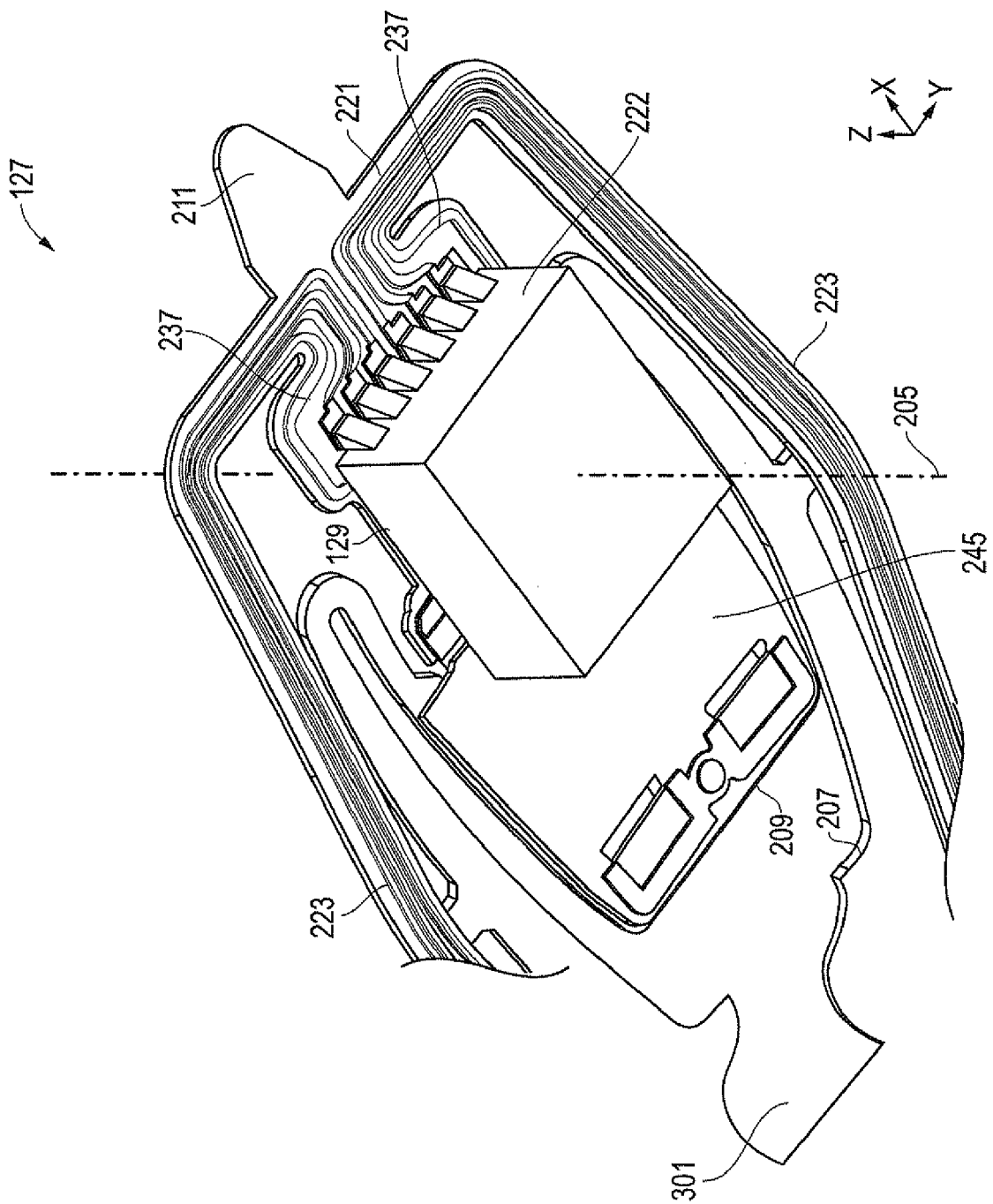
FIG. 6 is a bottom isometric view of one embodiment of the suspension and is constructed in accordance with the invention.

In the embodiment shown in FIGS. 6 and 7, the slider 129 is provided with signals through six traces 221, and the piezos 239 are provided with signals through two traces 237 that are laterally spaced outboard from the six traces 221. As best shown in FIGS. 6, 7 and 15, the trace outrigger portions 223 laterally converge at the trailing edge limiter 211, longitudinally extend toward the slider 129 to define a trace neck width 261, and then diverge laterally from the trace neck width 261 to the slider 129 to define a trace slider width 263 that is greater than the trace neck width 261.

Figure 9:
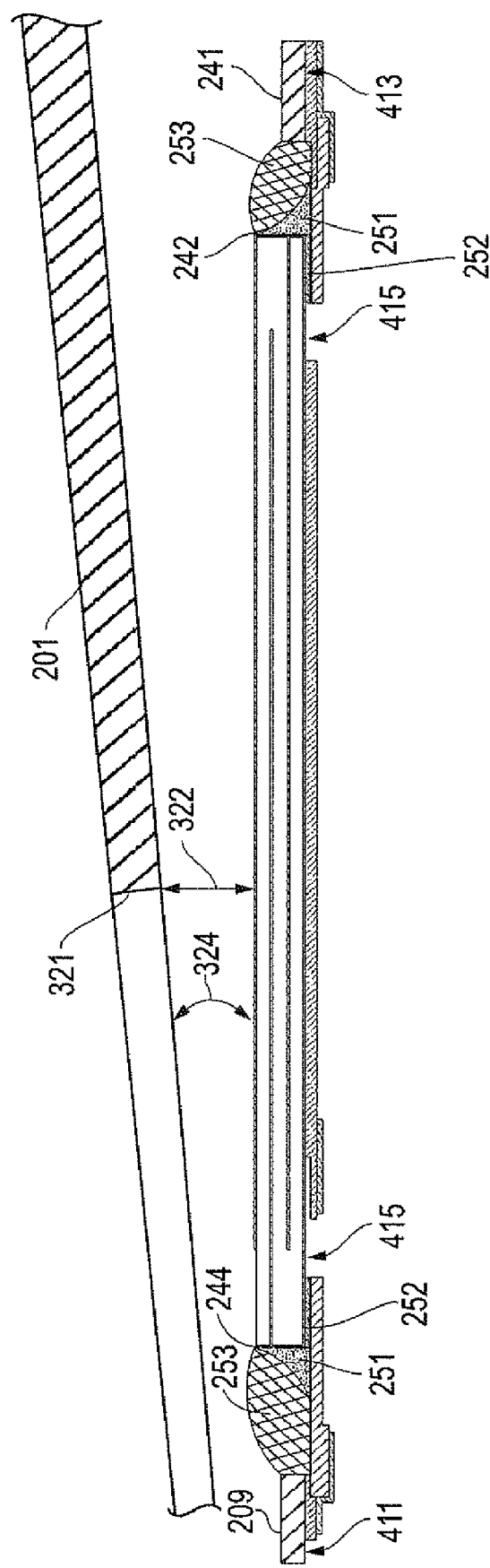
FIG. 9 is an enlarged, partially sectioned side view of one embodiment of a piezo portion of the suspension and is constructed in accordance with the invention.
Figure 10:
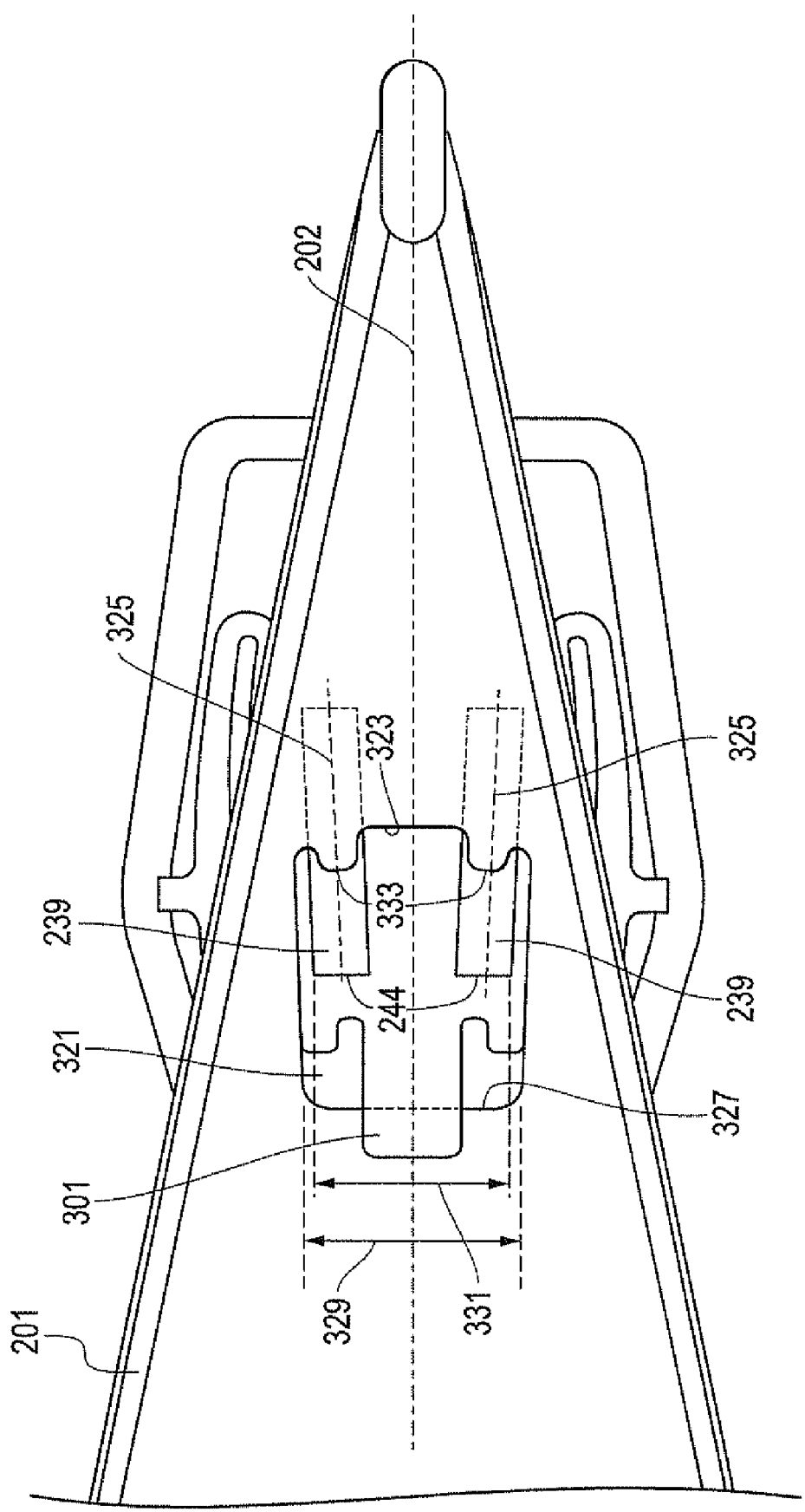
FIG. 10 is a simplified top view of one embodiment of the suspension constructed in accordance with the invention.
Figure 11:
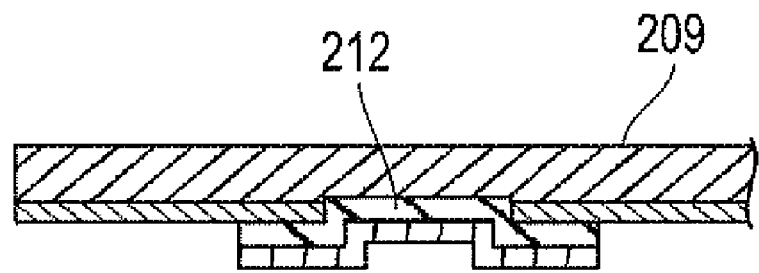
FIG. 11 is a partial sectional view of one embodiment of a leading edge connection for the piezo and is constructed in accordance with the invention.

Referring to FIGS. 8 and 9, the trailing end 242 of each piezo 239 is connected to the slider attachment platform 213 through a piezo hinge 241. The leading ends 244 of the piezos 239 are mounted to the leading edge portion 209 of the tongue 208. The leading ends 244 of the piezos 239 may be grounded directly to a steel layer (e.g., at leading edge portion 209 in FIG. 11) of the flexure through a small conductive via 212 (FIGS. 11 and 15).

As shown in FIG. 9, the piezos 239 may be connected to the leading edge portion 209 and to the piezo hinges 241 with solder and/or conductive adhesive at one or more locations 251, 252 (e.g., longitudinally, laterally or transversely). Structural adhesive 253 also may be used for sealing or additional strength. The steel layer of the flexure has lower surfaces 411, 413 extending substantially in an x-y plane. The piezos 239 have lower surfaces 415 extending substantially in the x-y plane such that they are co-planar with surfaces 411, 413.

As shown in FIGS. 4 and 8, a flexure hinge 243 is formed in the tongue 208 laterally between the pair of piezos 239 and the piezo hinges 241. The flexure hinge 243 is intersected by the dimple axis 205. A center link 240 extends from the leading edge portion 209 to the flexure hinge 243. Thus, in one embodiment, the microactuator 231 may be defined as piezos 239, piezo hinges 241, flexure hinge 243 and center link 240. Alternatively, piezo hinges may be provided at both ends of the piezos (not shown), rather than only on their trailing ends.

In the embodiment shown, each piezo 239 comprises a rectangular block having dimensions on the order of 1 mm in length, 0.220 mm in width, and about 40 to 60 microns in thickness. The tongue 208 has a steel layer with a thickness on the order of 20 microns. As best shown in FIGS. 4 and 8, the piezos 239 have a longitudinal length that is less than an overall length of the tongue 208. The piezos 239 have lower x-y surfaces that abut a polyimide layer 245 (FIGS. 6 and 14), having a transverse thickness of about 15 microns, that is substantially parallel to the x-y surfaces of the piezos. The polyimide layer 245 attenuates resonances and prevents significant movement of the piezos during shock. The polyimide layer 245 has a lateral dimension that is greater than a combined lateral dimension of the piezos 239. In addition, the polyimide layer 245 is secured to multiple steel portions of the tongue 208, and the polyimide layer 245 is free of contact with the slider 129.

Figure 3A:
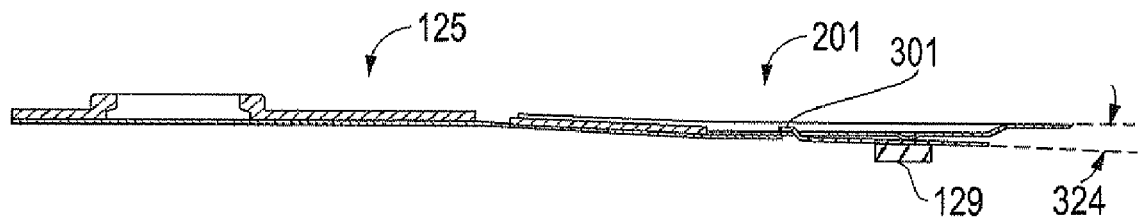
FIGS. 3A and 3B are side and enlarged side views, respectively, of one embodiment of the load beam and suspension and is constructed in accordance with the invention.
Figure 3B:
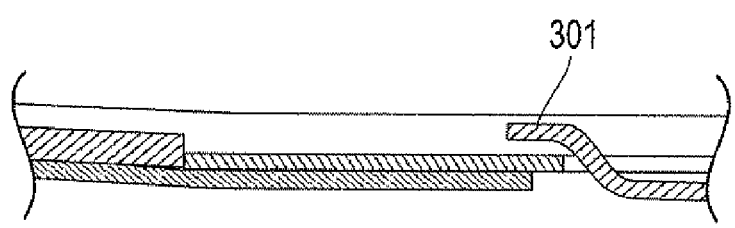

As illustrated in FIG. 9, each piezo 239 is provided with a minimum transverse clearance 322 (in the z-direction) on the order of 30 microns relative to the load beam 201 when the disk drive is not in operation, or prior to loading the slider on the disk. As shown in FIG. 3, the slider 129 has a nominal pitch rotational range 324 (i.e., about a lateral axis) of approximately 1.5 degrees to accommodate the load/unload process in the disk drive. The piezos 239, which may comprise thick-film or thin-film piezos, may be actuated by voltage applied to conductive layers inside the piezos 239. Each piezo 239 may comprise multiple piezoelectric material layers (e.g., FIG. 9 depicts three layers) with a voltage of 10 to 20 volts being applied across each layer. Opposite polarity voltage is applied to the two different piezos 239, such that one piezo expands and the other piezo contracts to rotate the slider 129. In one version, if the voltage is biased (e.g., +10+/−10V, or +20+/−20V), depoling of the piezos 239 may be eliminated.

Figure 13:
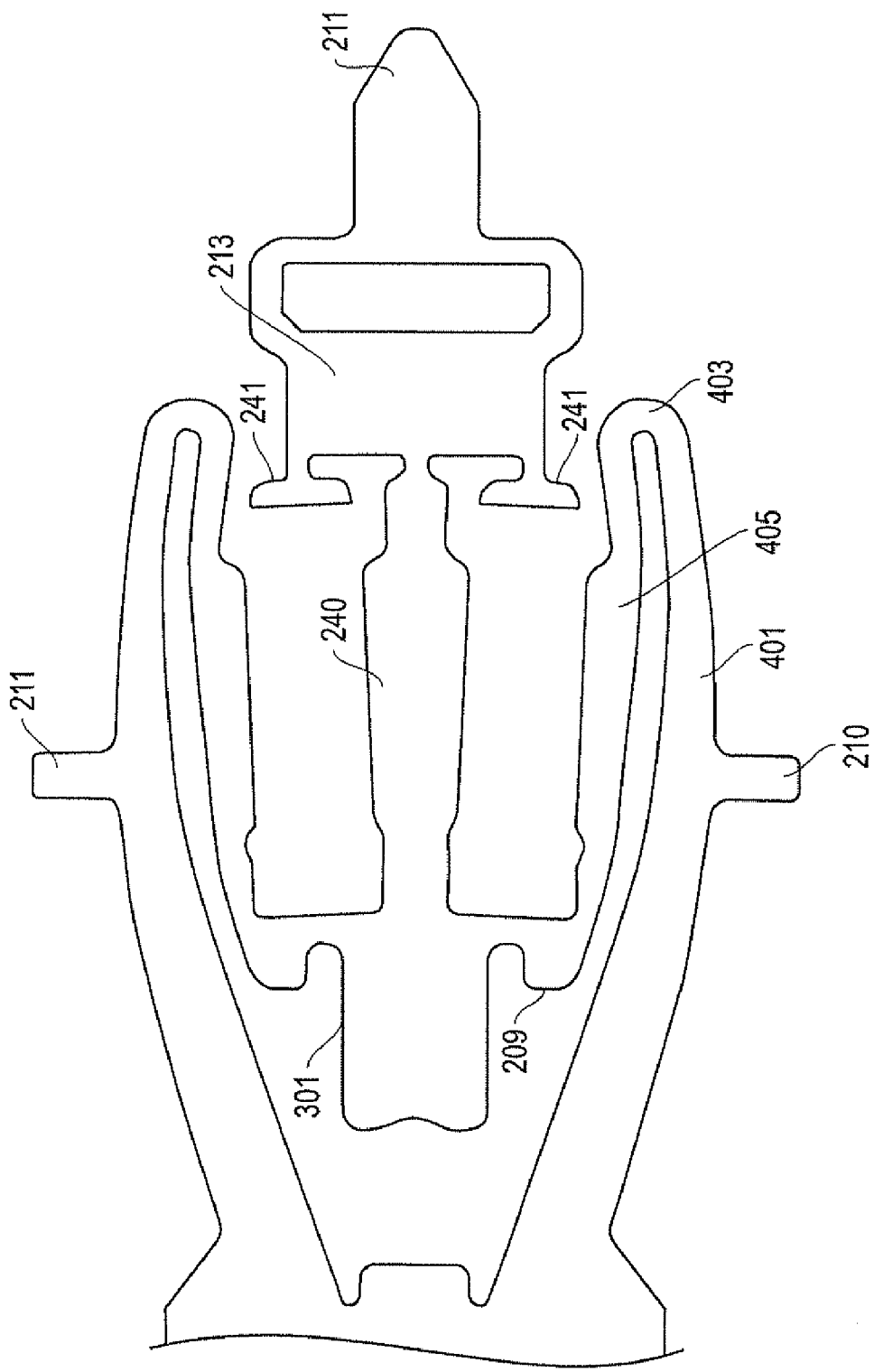
FIG. 13 is a partial plan view of one embodiment of a stainless steel layer for the flexure and is constructed in accordance with the invention.
Figure 14:
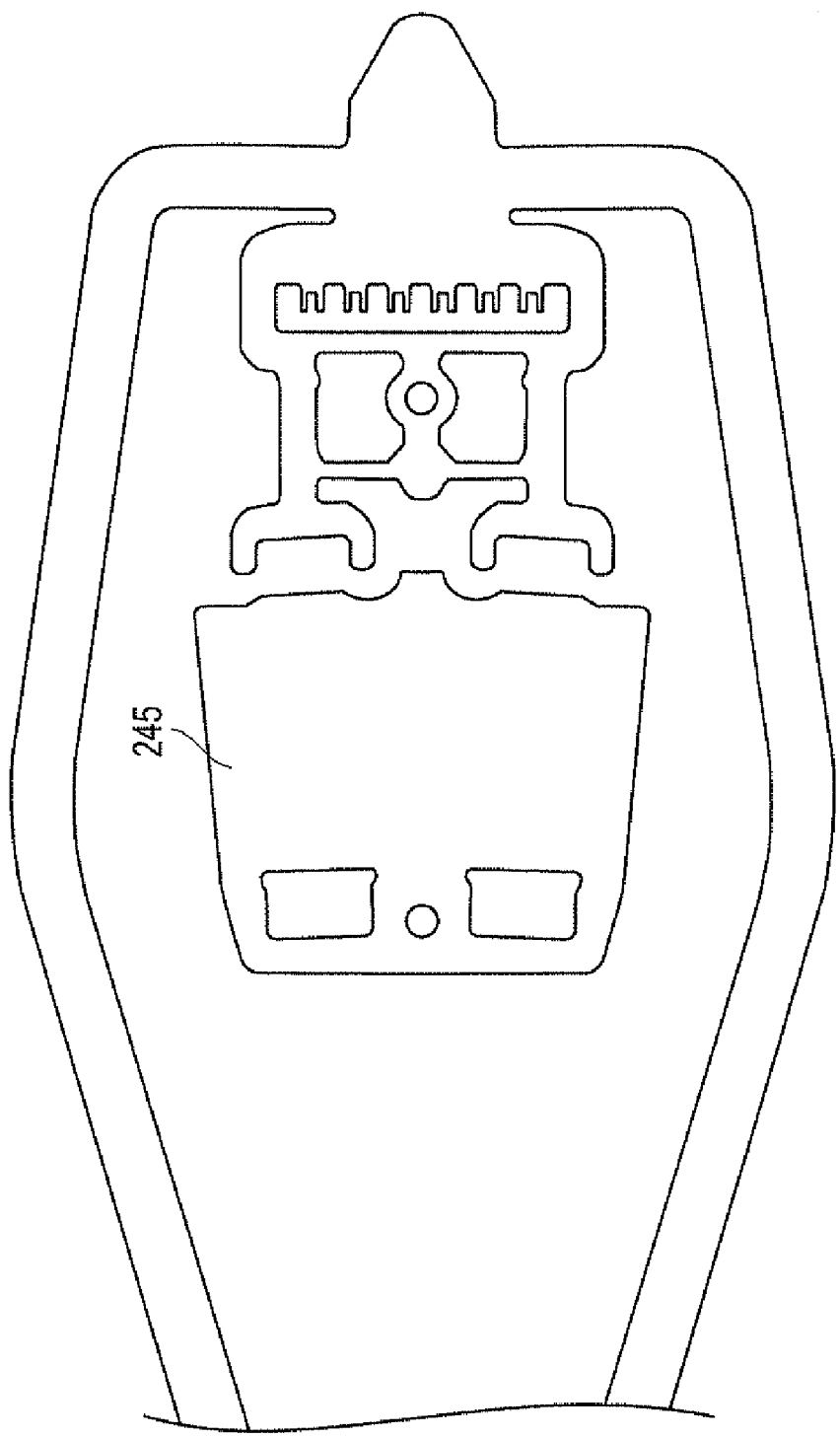
FIG. 14 is a partial plan view of one embodiment of an insulator layer for the flexure and is constructed in accordance with the invention.

As best shown in FIGS. 8 and 13, the flexure may comprise steel outriggers 401 that are located laterally between the tongue 208 and piezos 239, and the trace outrigger portions 223. The steel outriggers 401 extend longitudinally beyond the trailing ends 242 of the piezos 239 and, in the embodiment shown, beyond the piezo hinges 241 and flexure hinge 243. Returns 403 are formed at the distal ends of the steel outriggers 401. The steel outriggers reverse direction in the longitudinal direction from the returns 403 thereof and have extensions 405 that connect to the leading edge portion 209 where they are attached to the leading ends 244 of the piezos 239.

As described herein, the trailing edge limiter 211 (FIGS. 4-6) is located at the trailing end of the tongue 208. Some embodiments of the invention also utilize a leading edge limiter 301. The leading edge limiter 301 is located longitudinally adjacent the leading edge portion 209 of the tongue 208 and protrudes upward and rearward therefrom. The leading edge limiter 301 and trailing edge limiter 211 serve to constrain slider/flexure transverse motion relative to the load beam 201 during shock Referring now to FIGS. 5 and 10, the leading edge limiter 301 extends through a window 321 formed in the load beam 201 extending in an x-y plane. The window 321 has a trailing edge 323 extending in the lateral direction that is located above and adjacent to a longitudinal midsection 325 (FIG. 10) of the piezos 239. The window 321 has a leading edge 327 that is longitudinally spaced apart from its trailing edge 323 to provide transverse clearance for leading edges 244 of the piezos 239 relative to the load beam 201. The window 321 also has a lateral dimension 329 that exceeds a combined lateral dimension 331 of the piezos 239.

In the embodiment shown, the window 321 is provided with tabs 333 (FIG. 10) that extend longitudinally a short distance from the trailing edge 323 toward leading edge 327. Centerlines of the tabs 333 are transversely located substantially above the centerlines of the piezos 239. In addition, the tabs 333 have narrower lateral dimensions than the piezos 239, such that any transverse deflection of the piezos would cause the piezos to be contacted by the tabs 333 away from the lateral side edges of the piezos.

The invention has numerous features that further improve its performance. For example, the polyimide (PI) and cover layer that bridge the piezo slots in the stainless, have several functions, including eliminating several resonances, and serving as a platform to prevent large piezo displacements during shock.

There are two dimples in one embodiment of the design. The load beam dimple is standard on all suspensions. However, the polyimide dimple bridges the gap between the bottom of the flexure tongue stainless steel and the slider. The polyimide dimple allows a direct transmission of the dimple force from the load beam dimple to the slider. The flexure/trace connection(s) are standard features and help to reduce turbulence off track caused by trace vibrations. The hinge is the center of rotation for the slider. The piezo hinges allow the two different piezos to simultaneously extend and contract in a linear manner, while allowing the slider attachment platform and slider to rotate.

The assembly process for the design shown may comprise inserting the two piezo actuators into two slots in the flexure tongue. The piezos may be electrically attached to the flexure using two or three solder balls on each end. Alternatively, a solder-reflow process may be used between selected portions of each end of the piezos. Additional bonding may be used on the piezo ends and the adjacent stainless steel of the flexure to provide additional structural integrity or sealing to prevent contamination. After attaching the piezos to the flexure tongue, the flexure may be attached to the suspension load beam as in a normal suspension assembly process. The slider assembly process is the same as for a conventional femto slider/suspension assembly.

The invention has numerous advantages over prior art designs. The invention is simple in that it only adds two additional elements in the piezo actuators. With regard to packaging, the design only adds an additional 20 to 30 microns of height to the standard femto slider/suspension requirements. The additional height is required to offset the top of the slider from the flexure bottom to allow unimpeded rotation to occur.

The invention maintains a low mass despite adding new components. The additional mass added by the piezos is almost completely balanced by the stainless slots removed from the flexure tongue. This design results in low mass and similar in z-direction shock performance as a conventional femto slider/suspension assembly.

This new design also provides low pitch and roll stiffnesses. The pitch and roll stiffnesses of the suspension are the same as for a standard suspension, resulting in no impact on flying ability of the air bearing system.

The invention may be provided with a high resonant frequency. While the primary motion of the slider is rotary, there is a small, lateral, unbalanced force with the design that excites the sway mode of the suspension. With the proper suspension design, the suspension sway mode and, hence, the first mode excited by the microactuator is in the range of 25 kHz. This is well above the 20 kHz requirement of a two-stage actuator second stage. Moreover, the rotary mode of the actuator is extremely high in frequency (e.g., on the order of >30 kHz). The performance will vary depending on the specific requirements of each application. The high frequency of the rotary mode essentially eliminates this mode from being a consideration for the second stage servo design.

Because the load beam, flexure and slider system are essentially unchanged from a conventional femto slider and suspension system, air turbulence excitation of the system and the resulting off-track performance is similar to existing devices. Furthermore, since there are no significant changes to the current slider suspension assembly process, no additional capital expenditures are required to accommodate the design.

While the invention has been shown or described in only some of its forms, it should be apparent to those skilled in the art that it is not so limited, but is susceptible to various changes without departing from the scope of the invention.

What is claimed is:

1. A suspension for a hard disk drive, comprising:
   a load beam having a longitudinal axis extending in a longitudinal direction x, and defining a lateral direction y that is orthogonal to the longitudinal direction x, and a transverse direction z that is orthogonal to both the longitudinal and lateral directions x, y, the load beam having a load beam dimple that defines a dimple axis extending in the transverse direction z;
   a flexure mounted to the load beam and having a tongue with a leading edge portion and a slider attachment platform that is longitudinally spaced apart from the leading edge portion;
   a slider mounted to the slider attachment platform and having a freedom of rotation about the dimple axis;
   traces extending along the flexure and in electrical communication with the slider, the traces having trace outrigger portions that are outboard of the tongue in the lateral direction; and
   a microactuator located in the tongue of the flexure and extending between the leading edge portion and the slider attachment platform, such that the microactuator selectively rotates the slider about the dimple axis.

2. A suspension according to claim 1, further comprising a polyimide dimple located between the flexure and the slider at the dimple axis, and at least one rigid structural adhesive pad located between the slider and the slider attachment platform.

3. A suspension according to claim 2, further comprising outer registration pads mounted transversely between the traces and the slider, and a center registration pad located laterally between the outer registration pads and mounted longitudinally adjacent the polyimide dimple.

4. A suspension according to claim 1, wherein the microactuator comprises a piezo actuating device.

5. A suspension according to claim 4, wherein the piezo actuating device comprises a plurality of piezos extending substantially longitudinally, the piezos being connected to the slider attachment platform with piezo hinges, and a flexure hinge formed in the tongue laterally between the pair of piezos and the piezo hinges, the flexure hinge being positioned at the dimple axis.

6. A suspension according to claim 5, wherein the piezos have piezo leading ends secured to the leading edge portion, and the piezos have piezo trailing ends that are secured to the piezo hinges.

7. A suspension according to claim 5, wherein the piezo hinges and the flexure hinge are aligned perpendicular to the longitudal axis.

8. A suspension according to claim 5, wherein the piezos extend substantially longitudinally, but each piezo is oriented with respect to the longitudinal axis at an angle of less than 5 degrees, such that the piezos are longitudinally symmetrical about the longitudinal axis.

9. A suspension according to claim 5, wherein the piezos have x-y surfaces that abut a polyimide layer that is substantially parallel to the x-y surfaces to attenuate resonance, and the piezos are connected to the leading edge portion.

10. A suspension according to claim 9, wherein the polyimide layer has a lateral dimension that is greater than a combined lateral dimension of the piezos, the polyimide layer is secured to multiple steel portions of the tongue, and the polyimide layer is free of contact with the slider.

11. A suspension according to claim 5, wherein the load beam dimple has a transverse dimension on the order of 7.5 microns to provide additional transverse clearance for the piezos with respect to the load beam.

12. A suspension according to claim 5, wherein each piezo comprises a rectangular block having dimensions on the order of 1 mm in length, 0.220 mm in width, and 40 to 60 microns in thickness, and a steel layer of the tongue has a thickness on the order of 20 microns.

13. A suspension according to claim 5, wherein each piezo is provided with a minimum transverse clearance on the order of 30 microns relative to the load beam, and the slider has a nominal 1.5 degrees of pitch rotational range to accommodate load/unload processes.

14. A suspension according to claim 5, wherein the piezos are actuated by voltage applied to conductive layers in the piezos, each piezo comprising multiple layers, and wherein opposite polarity voltage is applied to the piezos, such that one piezo expands and the other piezo contracts to rotate the slider about the dimple axis.

15. A suspension according to claim 14, wherein trailing ends of the piezos are provided with electrical energy through the traces, and leading ends of the piezos are grounded directly to a steel layer of the flexure through a copper via.

16. A suspension according to claim 15, wherein the flexure comprises steel outriggers that are located laterally between the piezos and the trace outrigger portions, the steel outriggers extend longitudinally beyond the trailing ends of the piezos to form returns, and the steel outriggers reverse direction in the longitudinal direction from the returns thereof to the leading edge portion and attach to the leading ends of the piezos.

17. A suspension according to claim 5, wherein the flexure has a steel layer with lower surfaces extending substantially in an x-y plane, the piezos have lower surfaces extending substantially in an x-y plane, and the lower surfaces of the flexure steel layer and piezos are substantially co-planar.

18. A suspension according to claim 1, further comprising a trailing edge limiter at a trailing edge of the tongue, and a leading edge limiter extending from the leading edge portion of the tongue, such that the leading edge limiter protrudes through a window formed in the load beam.

19. A suspension according to claim 18, wherein the window has a trailing edge extending in the lateral direction that is located above and adjacent a longitudinal midsection of the microactuator, and the window has a leading edge that is longitudinally spaced apart from its trailing edge to provide transverse clearance for a leading edge of the microactuator relative to the load beam, the window also having a lateral dimension that exceeds a lateral dimension of the microactuator.

20. A suspension according to claim 19, wherein the window has tabs extending longitudinally from the window trailing edge, and the tabs having narrower lateral dimensions than the microactuator, such that any transverse deflection of the microactuator causes the microactuator to be contacted by the tabs away from lateral side edges of the microactuator.

21. A suspension according to claim 1, wherein the trace outrigger portions laterally converge at a trailing edge limiter of the tongue, longitudinally extend toward the slider to define a trace neck width, and then diverge laterally from the trace neck width to the slider to define a trace slider width that is greater than the trace neck width.

22. A suspension according to claim 1, wherein the slider has transducers for reading data from a magnetic disk, and the microactuator rotates the slider +/−0.02 degrees about the dimple axis, which laterally translates the transducers by +/−0.16 microns relative to the longitudinal axis.

23. A disk drive, comprising:
an enclosure having a magnetic media disk rotatably mounted thereto;
an actuator movably mounted to the enclosure;
a suspension mounted to the actuator; the suspension comprising:
a load beam having a longitudinal axis extending in a longitudinal direction x, and defining a lateral direction y that is orthogonal to the longitudinal direction x, and a transverse direction z that is orthogonal to both the longitudinal and lateral directions x, y, the load beam having a load beam dimple that defines a dimple axis extending in the transverse direction z;
a flexure mounted to the load beam and having a tongue with a leading edge portion and a slider attachment platform that is longitudinally spaced apart from the leading edge portion;
a slider mounted to the slider attachment platform and having a transducer for reading data from the magnetic media disk, the slider also having a freedom of rotation about the dimple axis;
traces extending along the flexure and in electrical communication with the slider, the traces having trace outrigger portions that are outboard of the tongue in the lateral direction; and
a microactuator located in the tongue of the flexure and extending between the leading edge portion and the slider attachment platform, such that the microactuator selectively rotates the slider about the dimple axis.

24. A disk drive according to claim 23, further comprising a polyimide dimple located between the flexure and the slider at the dimple axis, and at least one rigid structural adhesive pad located between the slider and the slider attachment platform.

25. A disk drive according to claim 24, further comprising outer registration pads mounted transversely between the traces and the slider, and a center registration pad located laterally between the outer registration pads and mounted longitudinally adjacent the polyimide dimple.

26. A disk drive according to claim 23, wherein the microactuator comprises a piezo actuating device.

27. A disk drive according to claim 26, wherein the piezo actuating device comprises a plurality of piezos extending substantially longitudinally, the piezos being connected to the slider attachment platform with piezo hinges, and a flexure hinge formed in the tongue laterally between the pair of piezos and the piezo hinges, the flexure hinge being positioned at the dimple axis.

28. A disk drive according to claim 27, wherein the piezos have piezo leading ends secured to the leading edge portion, and the piezos have piezo trailing ends that are secured to the piezo hinges.

29. A disk drive according to claim 27, wherein the piezo hinges and the flexure hinge are aligned perpendicular to the longitudal axis.

30. A disk drive according to claim 27, wherein the piezos extend substantially longitudinally, but each piezo is oriented with respect to the longitudinal axis at an angle of less than 5 degrees, such that the piezos are longitudinally symmetrical about the longitudinal axis.

31. A disk drive according to claim 27, wherein the piezos have x-y surfaces that abut a polyimide layer that is substantially parallel to the x-y surfaces to attenuate resonance, and the piezos are connected to the leading edge portion.

32. A disk drive according to claim 31, wherein the polyimide layer has a lateral dimension that is greater than a combined lateral dimension of the piezos, the polyimide layer is secured to multiple steel portions of the tongue, and the polyimide layer is free of contact with the slider.

33. A disk drive according to claim 27, wherein the load beam dimple has a transverse dimension on the order of 7.5 microns to provide additional transverse clearance for the piezos with respect to the load beam.

34. A disk drive according to claim 27, wherein each piezo comprises a rectangular block having dimensions on the order of 1 mm in length, 0.220 mm in width, and 40 to 60 microns in thickness, and a steel layer of the tongue has a thickness on the order of 20 microns.

35. A disk drive according to claim 27, wherein each piezo is provided with a minimum transverse clearance on the order of 30 microns relative to the load beam, and the slider has a nominal 1.5 degrees of pitch rotational range to accommodate load/unload processes.

36. A disk drive according to claim 27, wherein the piezos are actuated by voltage applied to conductive layers in the piezos, each piezo comprising multiple layers, and wherein opposite polarity voltage is applied to the piezos, such that one piezo expands and the other piezo contracts to rotate the slider about the dimple axis.

37. A disk drive according to claim 36, wherein trailing ends of the piezos are provided with electrical energy through the traces, and leading ends of the piezos are grounded directly to a steel layer of the flexure through a copper via.

38. A disk drive according to claim 37, wherein the flexure comprises steel outriggers that are located laterally between the piezos and the trace outrigger portions, the steel outriggers extend longitudinally beyond the trailing ends of the piezos to form returns, and the steel outriggers reverse direction in the longitudinal direction from the returns thereof to the leading edge portion and attach to the leading ends of the piezos.

39. A disk drive according to claim 27, wherein the flexure has a steel layer with lower surfaces extending substantially in an x-y plane, the piezos have lower surfaces extending substantially in an x-y plane, and the lower surfaces of the flexure steel layer and piezos are substantially co-planar.

40. A disk drive according to claim 23, further comprising a trailing edge limiter at a trailing edge of the tongue, and a leading edge limiter extending from the leading edge portion of the tongue, such that the leading edge limiter protrudes through a window formed in the load beam.

41. A disk drive according to claim 40, wherein the window has a trailing edge extending in the lateral direction that is located above and adjacent a longitudinal midsection of the microactuator, and the window has a leading edge that is longitudinally spaced apart from its trailing edge to provide transverse clearance for a leading edge of the microactuator relative to the load beam, the window also having a lateral dimension that exceeds a lateral dimension of the microactuator.

42. A disk drive according to claim 41, wherein the window has tabs extending longitudinally from the window trailing edge, and the tabs having narrower lateral dimensions than the microactuator, such that any transverse deflection of the microactuator causes the microactuator to be contacted by the tabs away from lateral side edges of the microactuator.

43. A disk drive according to claim 23, wherein the trace outrigger portions laterally converge at a trailing edge limiter of the tongue, longitudinally extend toward the slider to define a trace neck width, and then diverge laterally from the trace neck width to the slider to define a trace slider width that is greater than the trace neck width.

44. A disk drive according to claim 23, wherein the microactuator rotates the slider +/−0.02 degrees about the dimple axis, which laterally translates the transducer by +/−0.16 microns relative to the longitudinal axis.

* * * * *